May 13, 1947.  B. STECHBART  2,420,503
OPTICAL RETICLE
Filed Aug. 31, 1944  3 Sheets-Sheet 1
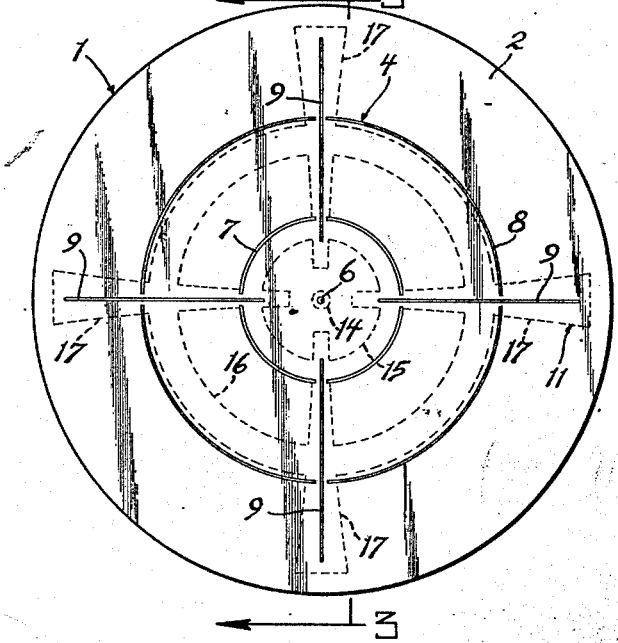
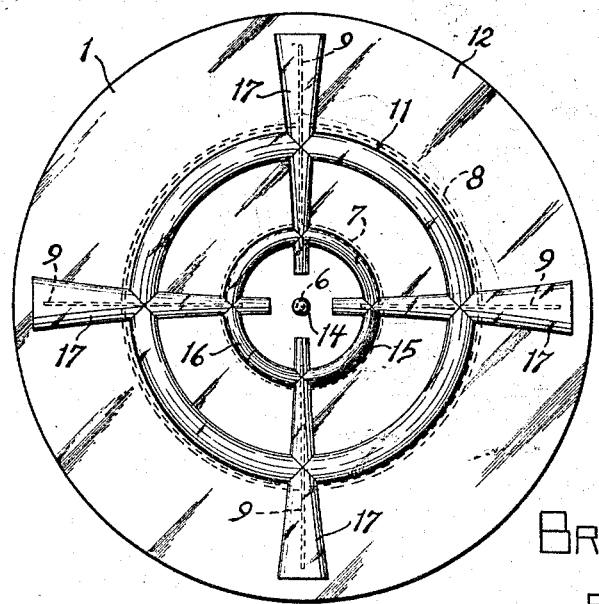
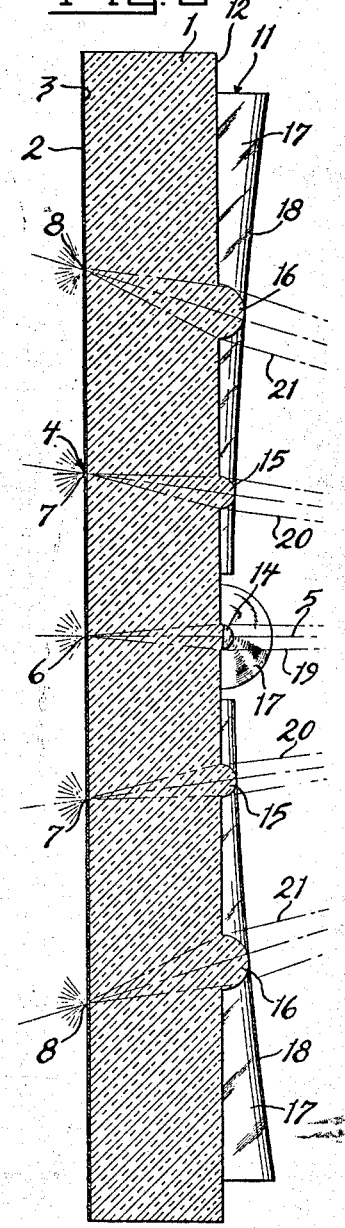
INVENTOR
BRUNO STECHBART
BY Robert F. Miehle, jr.
ATTY.

May 13, 1947.   B. STECHBART   2,420,503
OPTICAL RETICLE
Filed Aug. 31, 1944   3 Sheets-Sheet 2

INVENTOR
BRUNO STECHBART
BY Robert F. Miehle Jr.
ATTY.

May 13, 1947.     B. STECHBART     2,420,503
OPTICAL RETICLE
Filed Aug. 31, 1944     3 Sheets-Sheet 3
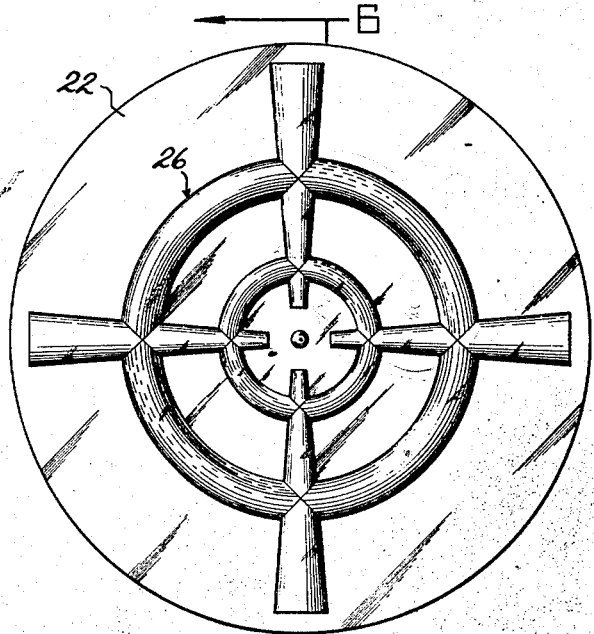
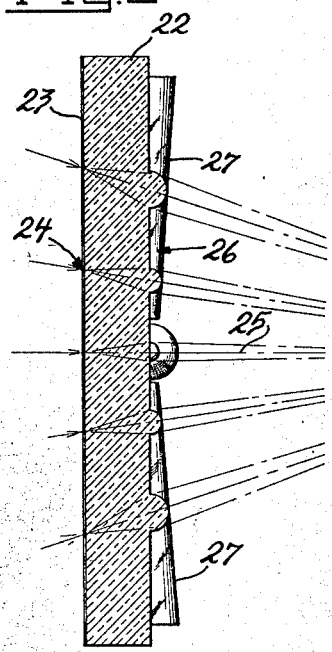
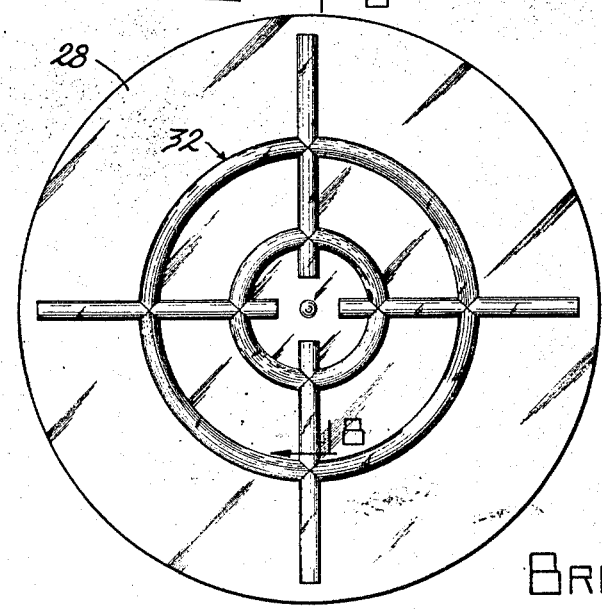
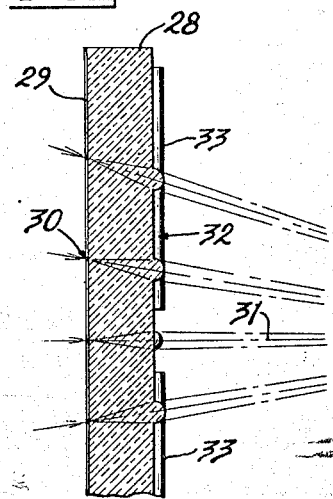
INVENTOR
BRUNO STECHBART Patented May 13, 1947

Examiner's Copy 2,420,503

UNITED STATES PATENT OFFICE 2,420,503

OPTICAL RETICLE

Bruno Stechbart, Park Ridge, Ill., assignor to The Bell & Howell Company, Chicago, Ill., a corporation of Illinois Application August 31, 1944, Serial No. 552,107

4 Claims. (Cl. 88—1)

My invention relates particularly to optical reticles of the illuminated type from which images of the illuminated reticle designs thereof are projected by projection objectives to provide sighting images.

Objects of the invention reside in the provision of a novel and effective optical reticle of the above type which provides adequate brilliancy throughout the projected image of the reticle design thereof, and which promotes uniform brilliancy throughout the projected image.

The invention will be better understood by reference to the accompanying drawing forming a part hereof and in which—

Figure 1 is a face elevational view of an optical reticle embodying one form of my invention;

Figure 2 is an opposite face elevational view of the same;

Figure 3 is an enlarged sectional view substantially on the line 3—3 of Figure 1;

Figure 5 is a face elevational view of an optical reticle embodying another form of my invention;

Figure 6 is a sectional view substantially on the line 6—6 of Figure 5;

Figure 7 is a face elevational view of an optical reticle embodying another form of my invention; and Figure 8 is a partial sectional view substantially on the line 8—8 of Figure 7.

Figure 4:
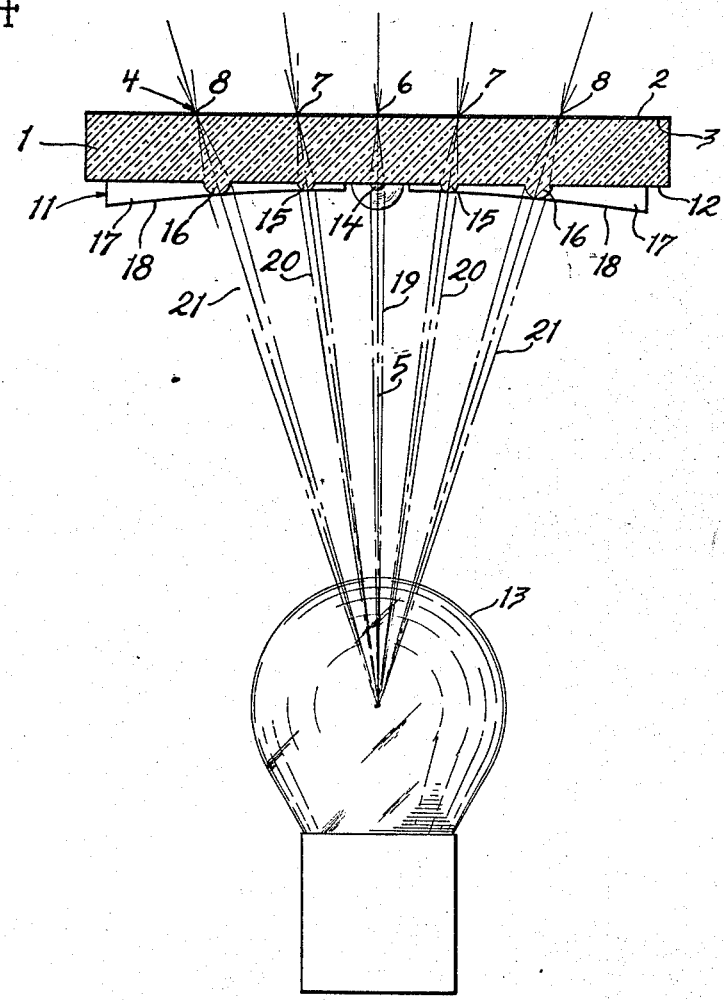
Figure 4 is a sectional view of the reticle similar to Figure 3 and showing it in cooperating relation with a light source.

Referring to Figures 1 to 4 inclusive, a body of molded light transmitting material, such as optical glass, and of circular disk form is designated at 1, and an opaque mask 2 is disposed at one face 3 of the body and as shown comprises a paint coating. The mask is provided with a light opening therethrough in the form of a reticle design pattern, generally designated at 4, and radiating from a light axis 5 disposed centrally of and normal to the body 1, and as shown this light opening comprises a center light opening portion 6 at the light axis, two annular light opening portions 7 and 8 of different diameters disposed concentrically of the light axis and four light opening portions 9 spaced equiangularly about and extending radially of the light axis, the pattern of the light opening, except for the center light opening 6, being thus of lineal character.

A condensing lens system, generally designated at 11, is formed integrally with and at the opposite face 12 of the body 1 and is in the form of a reticle design pattern corresponding with the pattern of the light opening 4 of the mask and radiating from the light axis and disposed in optically registering relation with the pattern of the light opening 4 for concentrating light thereat from a light source, shown in Figure 4 in the form of an incandescent lamp 13, on and spaced along the light axis from the body 1 and consequently from the mask and condensing lens system. The lens system comprises a center lens element 14, two annular elements 15 and 16 of different diameters disposed concentrically of the light axis and four lens elements 17 spaced equiangularly about and extending radially of the light axis, these lens elements respectively corresponding and being disposed in optically registering relation with the light opening portions 6, 7, 8 and 9 of the mask. The lens system, except for the center lens element 14, is thus of lineal character, and the center lens element 14 is of convex hemispherical form and the lens elements 15, 16 and 17, being of lineal character, are of convex semi-circular cross section.

The condensing lens system 11 has the convexly surface face thereof facing the light source 13, and the radii of the convex surface curvature and the lateral extent of the several portions of the lens system increase outwardly from the light axis. Thus, not only is light concentrated at the several portions of the light opening to provide adequate brilliancy of illumination throughout the same, but the area of the light concentrated is increased radially outward from the light axis to compensate for the light dispersion increasing outwardly from the light axis, with the result that uniformity of brilliance of illumination of the light opening is promoted.

As shown, the convexly surface face of the condensing lens system, which faces the light source, defines a concave surface of revolution of the light axis and facing the light source, as designated at 18 in Figures 3 and 4, which provides for the proper focal relation of the several portions of the condensing lens system with the flat light opening of the mask, it being also observed that this arrangement also causes the light from the light source to desirably impinge on the radially extending lens elements 17 at angles approximating or approaching ninety degrees in axial planes of the light axis.

To illustrate, in Figures 3 and 4, the light paths from the light source through the condensing lens system and to the light opening of the mask at the center light opening portion 6, at the smaller annular light opening portion 7 and at the larger annular light opening portion 8, are respectively designated at 19, 20 and 21, it being observed that the area of the light concentrated increases outwardly from the light axis.

Referring to Figures 5 and 6, a reticle, substantially the same as that of Figures 1 to 4, comprises a body 22 of light transmitting material and of circular disk form, an opaque mask 23 disposed at one face of the body and provided with a light opening therethrough in the form of a reticle design pattern, generally designated at 24, and radiating from the light axis 25, and a condensing lens system 26 formed integrally with and at the opposite face of the body and in the form of a reticle design pattern corresponding with the pattern of the light opening 24 and radiating from the light axis and disposed in optically registering relation with pattern of the light opening for concentrating light thereat from a light source on and spaced along the light axis from the body 22 and consequently from the mask and condensing lens system.

The reticle of Figures 5 and 6 functions in the same manner as that of Figures 1 to 4, and is quite similar thereto with the exception that, instead of the convexly surfaced face of the condensing lens system defining a concave surface of revolution of the reticle axis as in Figures 1 to 4, the convexly surface face 27 of the condensing lens system of Figures 5 and 6 defines an internal frusto-conical surface of revolution of the light axis and facing the light source, the frusto-conical surface of revolution being of more simple form though it is less optically correct in that it only approximates the more optically correct concave surface of revolution.

Referring to Figures 7 and 8, a reticle, generally the same as those of Figures 1 to 4 and Figures 5 and 6, comprises a body 28 of light transmitting material and of circular disk form, an opaque mask 29 disposed at one face of the body and provided with a light opening therethrough in the form of a reticle design pattern, generally designated at 30, and radiating from the light axis 31, and a condensing lens system 32 formed integrally with and at the opposite face of the body and in the form of a reticle design pattern corresponding with the pattern of the light opening 30 and radiating from the light axis and disposed in optically registering relation with the pattern of the light opening for concentrating light thereat from a light source on and spaced along the light axis from the body 28 and consequently from the mask and condensing lens system.

The reticle of Figures 7 and 8 functions in the same manner as those of Figures 1 to 4 and Figures 5 and 6 in so far as the concentration of light at the pattern of the light opening is concerned, and is similar thereto with the exception that, instead of the convexly surface face of the condensing lens system defining a concave or frusto-conical surface of revolution of the light axis as respectively in Figures 1 to 4 and Figures 5 and 6, the convexly surface face 33 of the condensing lens system of Figures 7 and 8 defines merely a flat surface of revolution of the light axis and facing the light source, and the radii of the convex surface curvature and the lateral extent of the several portions of the lens system are uniform throughout the condensing lens system, thus being of more simple form though lacking the advantage of the promotion of uniform brilliancy of illumination of the pattern of the light opening.

While I have thus described my invention, I do not wish to be limited to the precise details described, as changes may be readily made without departing from the spirit of my invention, but having thus described my invention, I claim as new and desire to secure by Letters Patent the following:

1. In an optical reticle, the combination of a body of light transmitting material and of disk form, a mask at one face of said body and provided with a light opening therethrough in the form of a reticle design pattern, and a condensing lens system formed integrally with and at the opposite face of said body and in the form of a reticle design pattern corresponding with the pattern of said light opening and disposed in optically registering relation therewith for concentrating light thereat.

2. In an optical reticle, the combination of a body of light transmitting material and of disk form, a mask at one face of said body and provided with a light opening therethrough in the form of a reticle design pattern of lineal character, and a condensing lens system formed integrally with and at the opposite face of said body and in the form of a reticle design pattern of lineal character corresponding with the pattern of said light opening and disposed in optically registering relation therewith for concentrating light thereat and comprising lineal portions of convex part circular cross section.

3. In an optical reticle, the combination of a body of light transmitting material and of disk form, a mask at one face of said body and provided with a light opening therethrough in the form of a reticle design pattern radiating from an axis disposed centrally of and normal to said body, and a condensing lens system formed integrally with and at the opposite face of said body and in the form of a reticle design pattern corresponding with the pattern of said light opening and radiating from said axis and disposed in optically registering relation with the pattern of said light opening for concentrating thereat light received from along said axis and the radii of the convex surface curvature and the lateral extent of the several portions of said lens system increasing outwardly from said axis.

4. In an optical reticle, the combination of a body of light transmitting material and of disk form, a mask at one face of said body and provided with a light opening therethrough in the form of a reticle design pattern radiating from an axis disposed centrally of and normal to said body, and a condensing lens system formed integrally with and at the opposite face of said body and in the form of reticle design pattern corresponding with the pattern of said light opening and radiating from said axis and disposed in optically registering relation with the pattern of said light opening for concentrating thereat light received from along said axis and having the convexly surfaced face thereof facing said received light and arranged to define at least approximately a concave surface of revolution of said axis and facing said received light and the radii of the convex surface curvature and the lateral extent of the several portions of said lens system increasing outwardly from said axis.

BRUNO STECHBART.

REFERENCES CITED

The following references are of record in the file of this patent:

UNITED STATES PATENTS

| Number | Name | Date |
|---|---|---|
| 533,324 | Stevens | Jan. 29, 1895 |
| 1,475,430 | Curwen | Nov. 27, 1923 |
| 1,918,705 | Ives | July 18, 1933 |
| 1,992,608 | Deninson | Feb. 26, 1935 |
| 2,271,196 | Kaszab | Jan. 27, 1942 |
| 1,692,973 | Babcock | Nov. 27, 1928 |
| 1,646,292 | Hough | Oct. 18, 1927 |
| 540,184 | Norris | May 28, 1895 |
| 2,061,097 | Fordyce | Nov. 17, 1936 |
| 1,726,314 | Rose | Aug. 27, 1929 |

FOREIGN PATENTS

| Number | Country | Date |
|---|---|---|
| 437,444 | Great Britain | Oct. 28, 1935 |